US011739503B2

(12) United States Patent
Hagiwara et al.

(10) Patent No.: US 11,739,503 B2
(45) Date of Patent: Aug. 29, 2023

(54) HYDRAULIC EXCAVATOR

(71) Applicant: HITACHI CONSTRUCTION MACHINERY CO., LTD., Tokyo (JP)

(72) Inventors: Naoki Hagiwara, Kasumigaura (JP); Kazuhiko Mizoguchi, Ishioka (JP); Shigeru Hirasawa, Mito (JP); Keitaro Ito, Tsuchiura (JP); Keiichirou Anahara, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 349 days.

(21) Appl. No.: 17/273,803

(22) PCT Filed: Oct. 11, 2019

(86) PCT No.: PCT/JP2019/040239
§ 371 (c)(1),
(2) Date: Mar. 5, 2021

(87) PCT Pub. No.: WO2020/080293
PCT Pub. Date: Apr. 23, 2020

(65) Prior Publication Data
US 2021/0310218 A1    Oct. 7, 2021

(30) Foreign Application Priority Data
Oct. 15, 2018    (JP) .................................. 2018-194647

(51) Int. Cl.
*E02F 9/26* (2006.01)
*B60Q 5/00* (2006.01)
(Continued)

(52) U.S. Cl.
CPC ................ *E02F 9/26* (2013.01); *B60Q 5/005* (2013.01); *E02F 9/24* (2013.01); *E02F 9/163* (2013.01)

(58) Field of Classification Search
CPC ... E02F 9/123; E02F 9/16; E02F 9/163; E02F 9/24; E02F 9/26; E02F 9/261; E02F 9/264; B60Q 5/005
See application file for complete search history.

(56) References Cited

U.S. PATENT DOCUMENTS 9,587,380 B2 * 3/2017 Matsumoto ............ H04N 7/183
11,479,945 B2 * 10/2022 Yamamoto .............. E02F 9/262
(Continued)

FOREIGN PATENT DOCUMENTS

CN        108026714 A      5/2018
JP     2002-294765 A     10/2002
(Continued)

OTHER PUBLICATIONS

Korean Office Action received in corresponding Korean Application No. 10-2021-7004781 dated Jul. 15, 2022.
(Continued)

*Primary Examiner* — Tyler J Lee
(74) *Attorney, Agent, or Firm* — MATTINGLY & MALUR, PC

(57) ABSTRACT

A hydraulic excavator is provided which makes it possible to allow an operator to surely recognize an alarm that notifies the operator of non-wearing of a seatbelt even when a work is performed in a situation in which a moving object is present around the machine. A controller outputs, when a moving object is detected and wearing of a seatbelt is detected by a seatbelt detection device, a first alarm through a notification device, outputs, when the moving object is not detected and non-wearing of the seatbelt is detected by the seatbelt detection device, a second alarm through the notification device, and outputs, when the moving object is detected and non-wearing of the seatbelt is detected by the (Continued)

seatbelt detection device, the second alarm preferentially over the first alarm through the notification device.

3 Claims, 7 Drawing Sheets

(51) Int. Cl.
*E02F 9/24* (2006.01)
*E02F 9/16* (2006.01)

(56) References Cited

U.S. PATENT DOCUMENTS

| | | |
|---|---|---|
| 2016/0005286 A1 | 1/2016 | Kiyota |
| 2016/0258134 A1 | 9/2016 | Matsumoto et al. |
| 2018/0245313 A1 | 8/2018 | Shibamori et al. |
| 2018/0258616 A1 | 9/2018 | Kiyota et al. |

FOREIGN PATENT DOCUMENTS

| | | |
|---|---|---|
| JP | 3821789 B2 | 9/2006 |
| JP | 2013-159193 A | 8/2013 |
| JP | 2014-181509 A | 9/2014 |
| JP | 2014-183500 A | 9/2014 |
| JP | 2017-145626 A | 8/2017 |
| JP | 2018-111981 A | 7/2018 |
| WO | 2015/025439 A1 | 2/2015 |
| WO | 2018/155567 A1 | 8/2018 |

OTHER PUBLICATIONS

Chinese Office Action dated Jan. 21, 2022, issued in corresponding Chinese Patent Application No. 201980054400.1.
International Preliminary Report on Patentability received in corresponding International Application No. PCT/JP2019/040239 dated Apr. 29, 2021.
International Search Report of PCT/JP2019/040239 dated Nov. 26, 2019.
Japanese Office Action received in corresponding Japanese Application No. 2018-194647 dated Sep. 6, 2022.

* cited by examiner

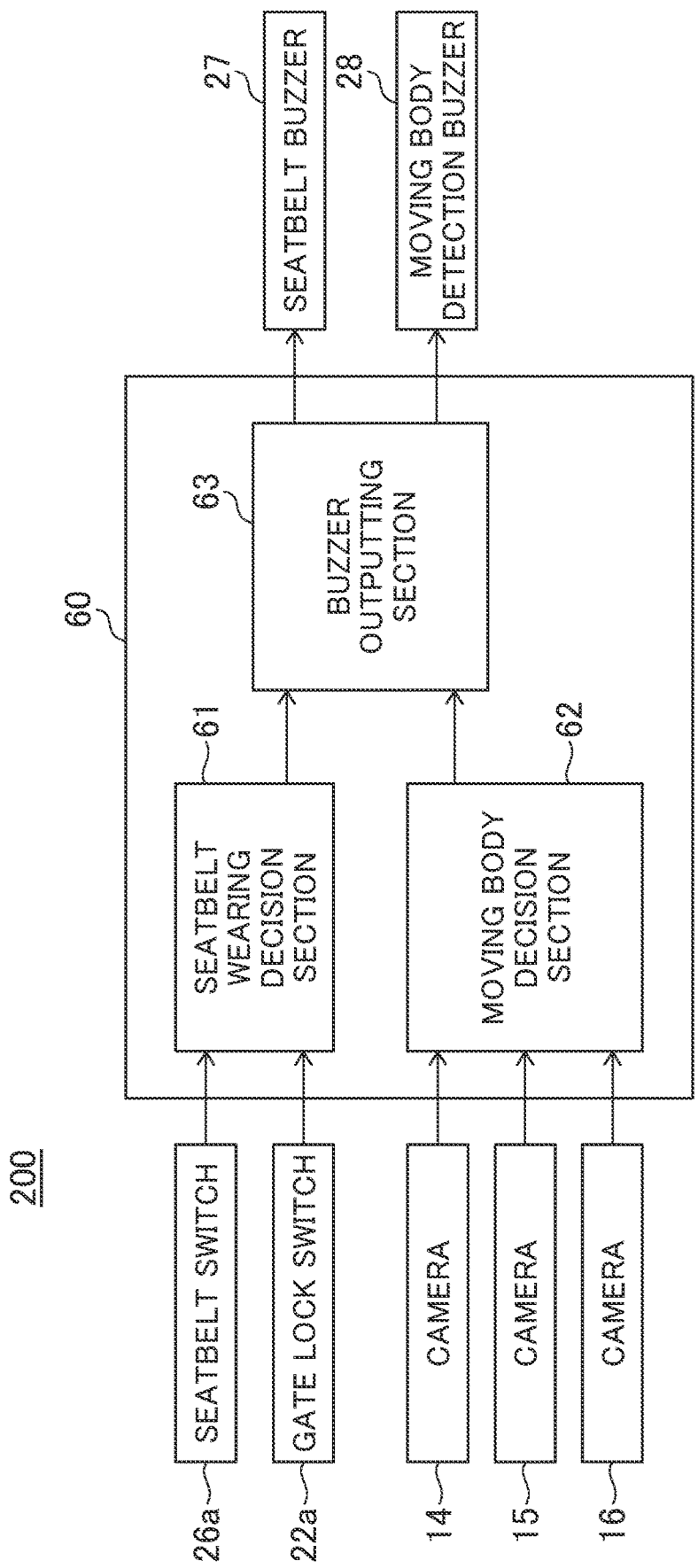

HYDRAULIC EXCAVATOR

TECHNICAL FIELD

The present invention relates to a hydraulic excavator.

BACKGROUND ART

As a prior art document that discloses a safety device for a construction machine that can call attention to an operator depending on a state of the construction machine, Patent Document 1 is available.

Patent Document 1 discloses a safety device for a construction machine including a state information acquisition section that acquires state information relating to a state of the construction machine, a seatbelt detection section that detects whether or not a seatbelt is worn on an operator, and a controller that controls a warning section to issue a warning on the basis of the state information when the seatbelt is not worn on the operator. The state information includes information relating to an operation position of a gate lock lever that is operated to a lock position that invalidates an instruction of an operation lever of the construction machine and an unlock position that validates an instruction of the operation lever. The controller controls, when the operation position of the gate lock lever is the unlock position, the warning section to issue a warning.

Further, as a prior art document that discloses a surroundings monitoring system for a work machine that is capable of ensuring effectiveness of a warning based on detection of a predetermined object that is a monitoring target and suppressing cumbersomeness to an operator, Patent Document 2 is available.

Patent Document 2 discloses a surroundings monitoring system for a work machine including an object detection section that detects a predetermined object present within a predetermined range around a work machine and an alarming section that issues an alarm by sound when the object is detected by the object detection section. When a state in which the object is detected by the object detection section continues, when a predetermined condition is satisfied, the alarming section stops the alarm by sound. Then, after the alarm by sound stops, the alarming section performs alarming by light.

PRIOR ART DOCUMENT

Patent Documents

Patent Document 1: JP-2017-145626-A
Patent Document 2: JP-2018-111981-A

SUMMARY OF THE INVENTION

Problem to be Solved by the Invention

When the safety device for a construction machine disclosed in Patent Document 1 and the surroundings monitoring system for a work machine disclosed in Patent Document 2 are incorporated in a hydraulic excavator, it is considered that it is possible to notify an operator of non-wearing of a seatbelt and detection of a moving object.

Incidentally, a hydraulic excavator may perform operation in such a situation that another worker or the like who guides the machine is around the machine, for example, for mounting the machine on a trailer or for parking the machine in a narrow parking place. In such a situation as described, the worker or the like is detected as a moving object, and the operator is obliged to perform an operation in a state in which an alarm for notifying the operator of detection of the moving object continues to sound. Therefore, in a case where the operator does not wear the seatbelt when the operator starts a work, in the hydraulic excavator described above, an alarm for the notification of detection of the moving object and an alarm for the notification of non-wearing of the seatbelt are issued simultaneously. Consequently, there is a possibility that the operator may fail to correctly recognize the alarm for the notification of non-wearing of the seatbelt and may continue the work with the seatbelt not worn.

The present invention has been made in view of the subject described above, and the object of the present invention is to provide a hydraulic excavator that makes it possible to allow an operator to surely recognize an alarm for notifying the operator of non-wearing of a seatbelt even when a work is performed in a situation in which a moving object is present around the machine.

Means for Solving the Problem

In order to achieve the object described above, according to the present invention, there is provided a hydraulic excavator including: a lower track structure; an upper swing structure provided above the lower track structure; an operation room provided in front of the upper swing structure; a camera that monitors surroundings of the upper swing structure; a notification device; a controller that detects presence/absence of a moving object from an image of the camera and outputs, in a case where the moving object is detected, an alarm through the notification device; a seatbelt provided in the operation room; and a seatbelt detection device configured to detect whether or not the seatbelt is worn, wherein the controller is configured to output, in a case where the moving object is detected and wearing of the seatbelt is detected by the seatbelt detection device, a first alarm through the notification device, output, in a case where the moving object is not detected and non-wearing of the seatbelt is detected by the seatbelt detection device, a second alarm through the notification device, and outputs, in a case where the moving object is detected and non-wearing of the seatbelt is detected by the seatbelt detection device, the second alarm preferentially over the first alarm through the notification device.

According to the present invention configured as described above, when a moving object is detected and non-wearing of the seatbelt is detected, the second alarm (alarm for the notification of non-wearing of the seatbelt) is outputted preferentially over the first alarm (alarm for the notification of detection of a moving object) through the notification device. Consequently, when a work is performed, for example, in such a situation in which a moving object such as another worker is present around the hydraulic excavator as a situation in which the hydraulic excavator is to be mounted on a trailer or the hydraulic excavator is to be parked at a narrow parking place, the operator can recognize with certainty the alarm for the notification of non-wearing of the seatbelt. Therefore, it is possible to prevent the operator from continuing the work while the operator remains without wearing the seatbelt.

Advantages of the Invention

With the hydraulic excavator according to the present invention, even when a work is performed in a situation in which a moving object is present around the machine, the operator can surely recognize the alarm for the notification of non-wearing of the seatbelt.

BRIEF DESCRIPTION OF THE DRAWINGS

FIG. 7 is a view depicting a configuration of an alarm system according to a second embodiment of the present invention.

MODES FOR CARRYING OUT THE INVENTION

Figure 1:
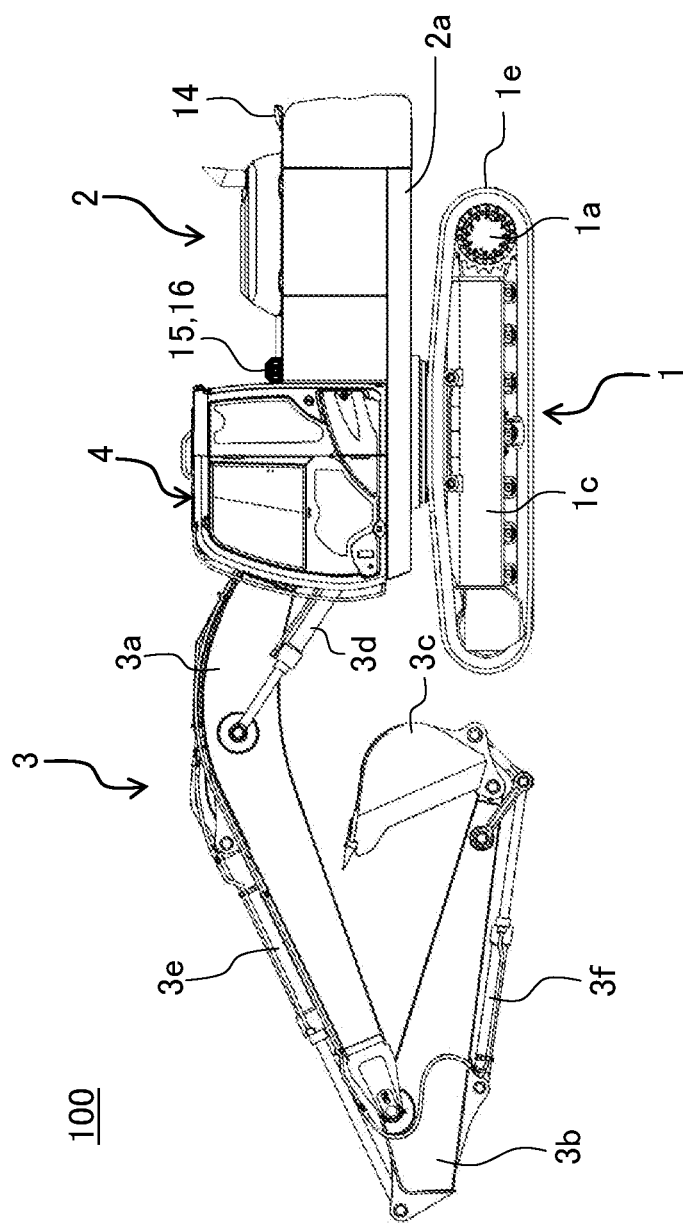
FIG. 1 is a side elevational view schematically depicting an appearance of a hydraulic excavator according to a first embodiment of the present invention.

In the following, an embodiment of the present invention is described with reference to the drawings. It is to be noted that, in the figures, equivalent members are denoted by like reference characters and an overlapping description is suitably omitted.

First Embodiment

FIG. 1 is a side elevational view schematically depicting an appearance of a hydraulic excavator according to a first embodiment of the present invention.

Referring to FIG. 1, the hydraulic excavator 100 schematically includes a lower track structure 1 of the crawler type, an upper swing structure 2 provided for swinging motion with respect to the lower track structure 1, and a front work implement 3 provided for upward and downward movement on the front side of the upper swing structure 2.

The front work implement 3 is configured by connecting a plurality of driven members (a boom 3a, an arm 3b, and a bucket 3c) which individually swing in the vertical direction, to each other. The boom 3a is rotatably supported at a base end thereof on a front portion of the upper swing structure 2. Further, to a tip of the boom 3a, the arm 3b is rotatably connected at one end thereof, and the bucket 3c is rotatably connected to the other end (tip) of the arm 3b. The boom 3a, the arm 3b, and the bucket 3c are driven by a boom cylinder 3d, an arm cylinder 3e, and a bucket cylinder 3f that are hydraulic actuators, respectively.

The lower track structure 1 includes a pair of crawlers 1e (1f) stretched around a pair of left and right crawler frames 1c (1d), respectively, and track hydraulic motors 1a (1b) as hydraulic actuators for driving the respective crawlers 1e (1f) through a reduction gear mechanism, not depicted, or the like. It is to be noted that, in FIG. 1, in regard to components of the lower track structure 1, only one of a pair of left and right components is depicted and has a reference character applied thereto, and in regard to the other component, only a reference character is indicated in brackets while illustration of the component is omitted.

The upper swing structure 2 is configured such that associated members are placed on a swing frame 2a that serves as a base, and the swing frame 2a is driven to swing with respect to the lower track structure 1 by a swing hydraulic motor (not depicted), which is a hydraulic actuator, and accordingly, the upper swing structure 2 can be swung with respect to the lower track structure 1.

On the swing frame 2a of the upper swing structure 2, not only an operation room 4 that allows an operator to get in and perform an operation of the hydraulic excavator 100 is arranged, but also an engine as a prime mover, a hydraulic pump and a pilot pump driven by the engine, a hydraulic circuit system for driving the hydraulic actuators (the track hydraulic motors 1a and 1b, the swing hydraulic motor (not depicted), the boom cylinder 3d, the arm cylinder 3e, and the bucket cylinder 3f), a controller 60 (depicted in FIG. 6) hereinafter described, and so forth are mounted. Cameras 14 to 16 for monitoring the surroundings of the machine body are mounted on a left, right, and rear portions of an upper portion of the upper swing structure 2.

Figure 2:
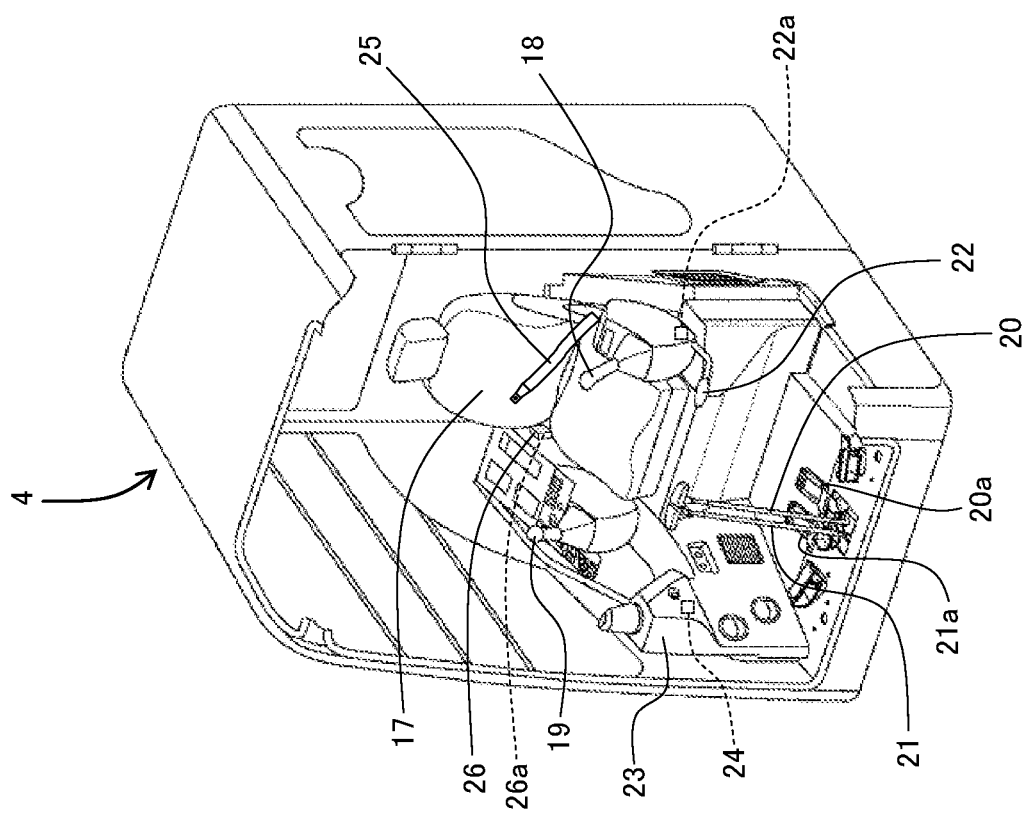
FIG. 2 is a perspective view depicting the inside of an operation room depicted in FIG. 1.

FIG. 2 is a perspective view depicting the inside of the operation room 4.

Referring to FIG. 2, in the operation room 4, an operator's seat 17 for being seated by an operator, operation levers 18 and 19 for performing an operation of the front work implement 3 and a swinging operation of the upper swing structure 2, travel levers 20 and 21 for operating the left and right track hydraulic motors 1a and 1b of the lower track structure 1, and left and right travel pedals 20a and 21a operable in an interlocking relation with the travel levers 20 and 21, respectively. At a position that can be seen easily from the operator in the operation room 4 and at which securing of an external visual field is not disturbed, a monitor 23 is placed which is a display device for displaying various kinds of information, a setting screen, and so forth relating to the hydraulic excavator 100. In the operation room 4, a buzzer 24 (notification device) for notifying an operator of various alarms by outputting sound or voice is placed. On the entrance side of the operation room 4 with respect to the operator's seat 17 (in the present embodiment, on the left side as viewed from the operator's seat 17), a gate lock lever 22 is provided which is operated to an unlock position (more particularly, a lowered position at which getting on/off of an operator is disturbed) and a lock position (more particularly, a raised position at which getting on/off of an operator is permitted). For the gate lock lever 22, a gate lock switch 22a is provided which becomes a closed state when the gate lock lever 22 is at the unlock position (lowered position) and an open state when the gate lock lever 22 is at the lock position (raised position). When the gate lock lever 22 is at the lock position, operation of the operation levers 18 and 19 and the travel levers 20 and 21 is invalidated. For the operator's seat 17, a seatbelt 25 and a buckle 26 for fixing the seatbelt 25 are provided. The buckle 26 has a seatbelt switch 26a provided thereon for detecting wearing of the seatbelt 25.

Figure 3:
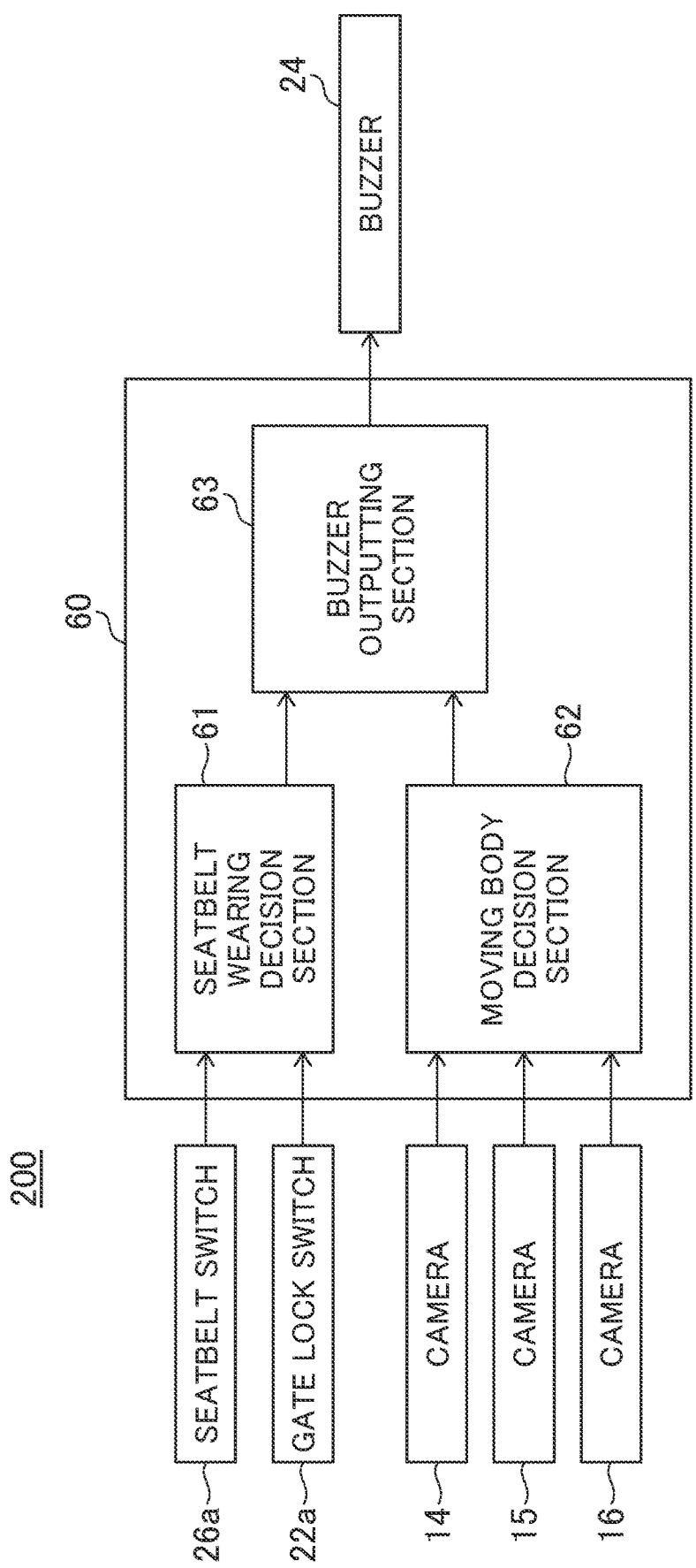
FIG. 3 is a view depicting a configuration of an alarm system incorporated in the hydraulic excavator depicted in FIG. 1.

FIG. 3 is a block diagram of an alarm system incorporated in the hydraulic excavator 100.

Referring to FIG. 3, the alarm system 200 includes the seatbelt switch 26a, the gate lock switch 22a, the cameras 14 to 16, the controller 60, and the buzzer 24.

The controller 60 includes a seatbelt wearing decision section 61, a moving object decision section 62, and a buzzer outputting section 63. The seatbelt wearing decision section 61 decides, on the basis of an input from the seatbelt switch 26a, whether or not the seatbelt is worn, and decides, on the basis of an input from the gate lock switch 22a, whether or not the gate lock lever 22 is at the unlock position. The moving object decision section 62 decides, on the basis of images captured by the cameras 14 to 16, whether or not a moving object is present. The buzzer outputting section 63 outputs an instruction signal to the buzzer 24 on the basis of results of decision of the seatbelt wearing decision section 61 and the moving object decision section 62.

Figure 4:
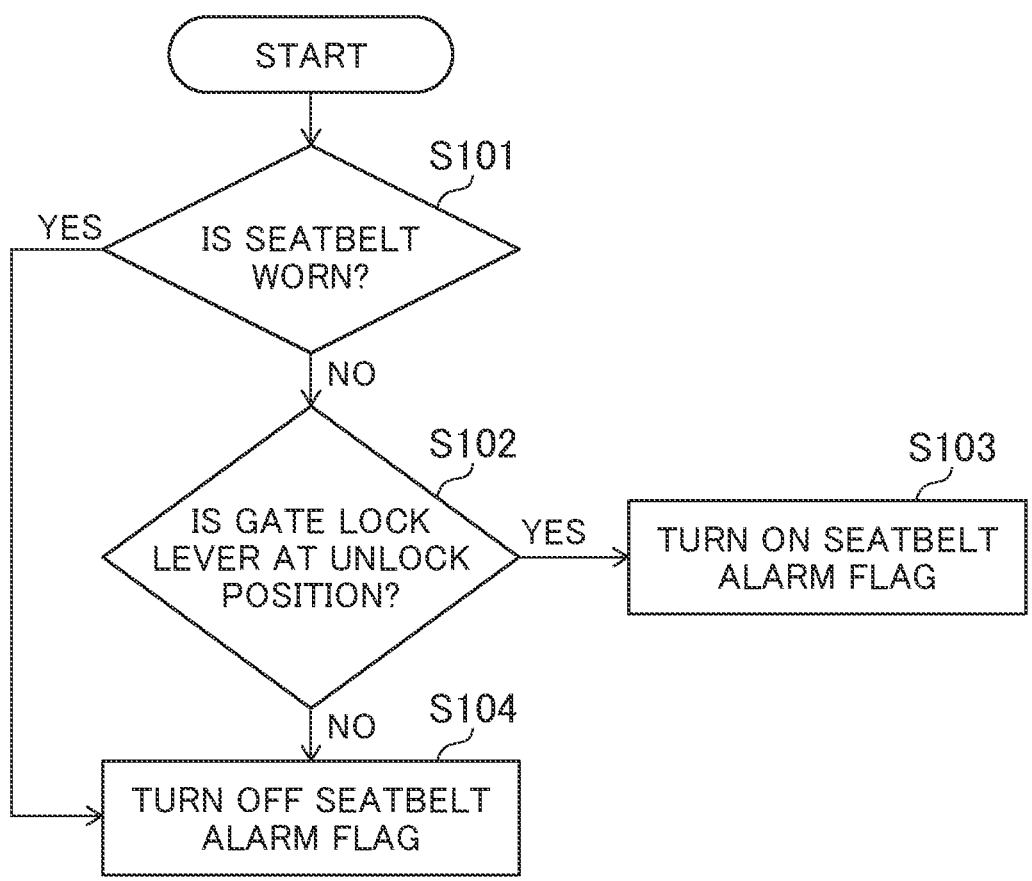
FIG. 4 is a flow chart depicting processing of a seatbelt wearing decision section of a controller depicted in FIG. 3.

FIG. 4 is a flow chart depicting processing of the seatbelt wearing decision section 61.

The seatbelt wearing decision section 61 first decides at step S101 whether or not the seatbelt 25 is worn (the seatbelt switch 26*a* is ON).

When the decision at step S101 is YES (the seatbelt 25 is worn), the seatbelt wearing decision section 61 turns OFF a seatbelt alarm flag at step S104 and then ends the processing.

When the decision at step S101 is NO (the seatbelt 25 is not worn), the seatbelt wearing decision section 61 decides at step S102 whether or not the gate lock lever 22 is at the unlock position (the gate lock switch 22*a* is OFF).

When the decision at step S102 is YES (the gate lock lever 22 is at the unlock position), the seatbelt wearing decision section 61 turns ON the seatbelt alarm flag at step S103 and then ends the processing.

When the decision at step S102 is NO (the gate lock lever 22 is at the lock position), the seatbelt wearing decision section 61 turns OFF the seatbelt alarm flag at step S104 and then ends the processing.

Figure 5:
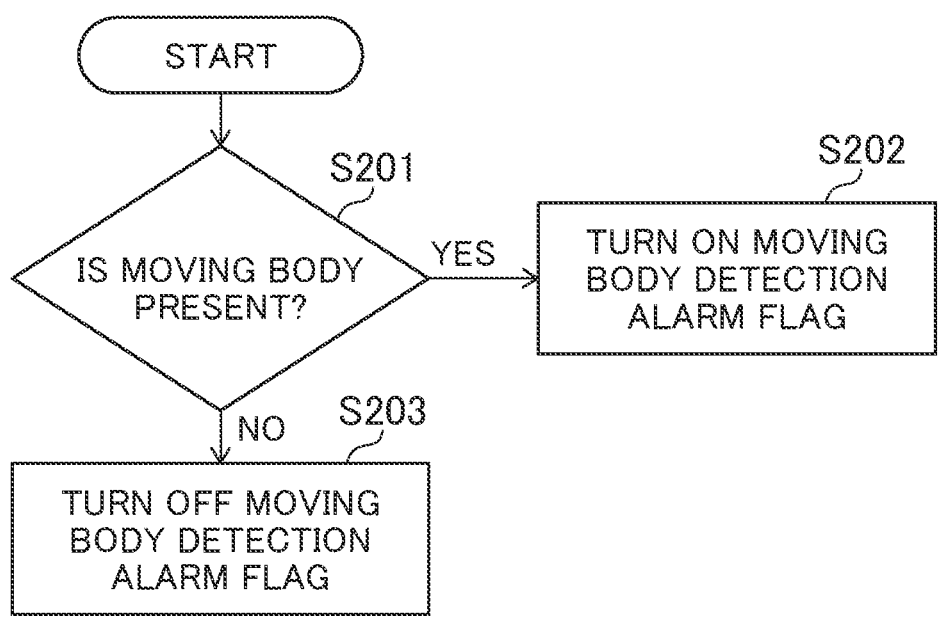
FIG. 5 is a flow chart depicting processing of a moving object decision section of the controller depicted in FIG. 3.

FIG. 5 is a flow chart depicting processing of the moving object decision section 62.

The moving object decision section 62 decides first at step S201 whether or not a moving object is present in peripheral images inputted from the cameras 14 to 16.

When the decision at step S201 is YES (a moving object is present), the moving object decision section 62 turns ON a moving object detection alarm flag at step S202 and then ends the processing.

When the decision at step S201 is NO (no moving object is present), the moving object decision section 62 turns OFF the moving object detection alarm flag at step S203 and then ends the processing.

Figure 6:
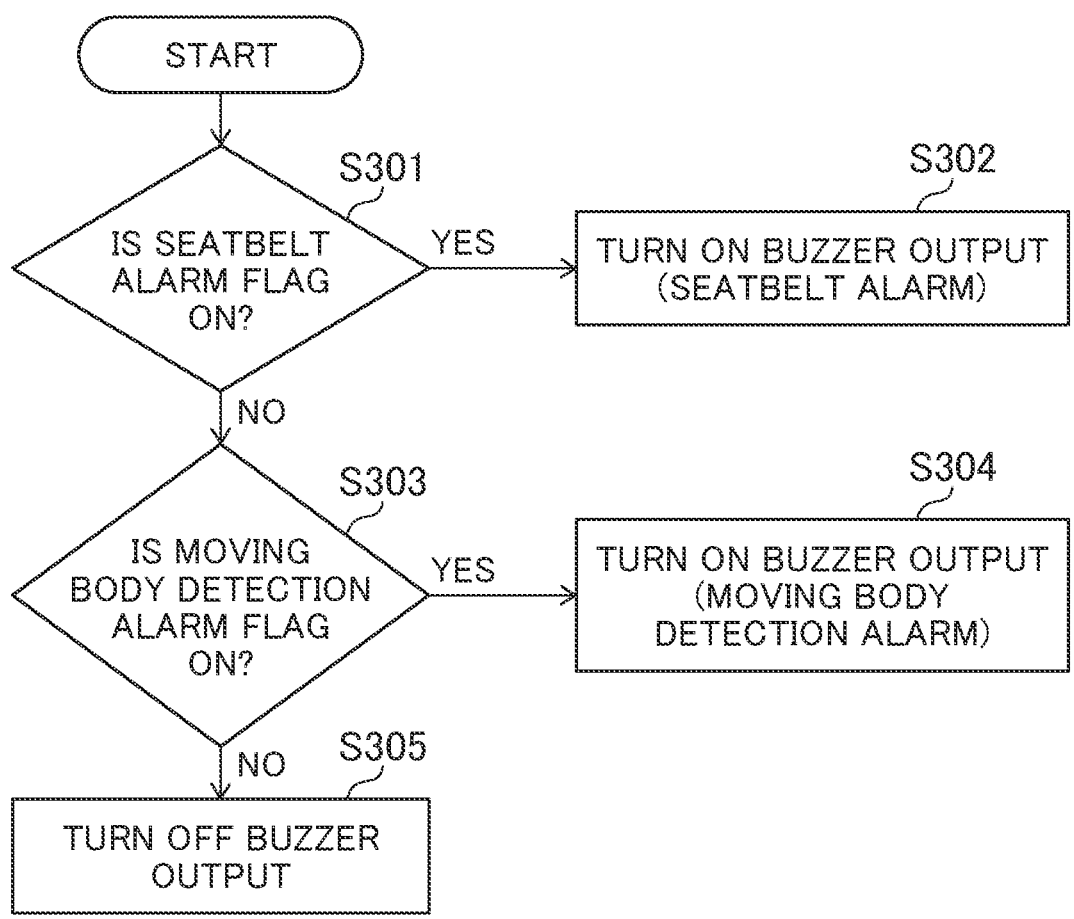
FIG. 6 is a flow chart depicting processing of a buzzer outputting section of the controller depicted in FIG. 3.

FIG. 6 is a flow chart depicting processing of the buzzer outputting section 63.

The buzzer outputting section 63 decides first at step S301 whether or not the seatbelt alarm flag inputted from the seatbelt wearing decision section 61 is ON.

When the decision at step S301 is YES (the seatbelt alarm flag is ON), the buzzer outputting section 63 outputs a seatbelt alarm (first alarm) through the buzzer 24 and then ends the processing.

When the decision at step S301 is NO (the seatbelt alarm flag is OFF), the buzzer outputting section 63 decides at step S303 whether or not the moving object detection alarm flag inputted from the moving object decision section 62 is ON.

When the decision at step S303 is YES (the moving object detection alarm flag is ON), the buzzer outputting section 63 outputs a moving object detection alarm (second alarm) through the buzzer 24 and then ends the processing.

When the decision at step S303 is NO (the moving object detection alarm flag is OFF), the buzzer outputting section 63 turns OFF the output of the buzzer 24 and the ends the processing.

In the present embodiment, in the hydraulic excavator 100 that includes the lower track structure 1, the upper swing structure 2 provided above the lower track structure 1, the operation room 4 provided in front of the upper swing structure 2, the cameras 14 to 16 that monitor surroundings of the upper swing structure 2, the notification device 24 provided in the operation room 4, the controller 60 that detects presence/absence of a moving object from images of the cameras 14 to 16 and that outputs, when the moving object is detected, an alarm through the notification device 24, the seatbelt 25 provided in the operation room 4, and the seatbelt detection device 26*a* that detects whether or not the seatbelt 25 is worn, the controller 60 outputs, when the moving object is detected and wearing of the seatbelt 25 is detected by the seatbelt detection device 26*a*, a first alarm through the notification device 24, outputs, when the moving object is not detected and non-wearing of the seatbelt 25 is detected by the seatbelt detection device 26*a*, a second alarm through the notification device 24, and outputs, when the moving object is detected and non-wearing of the seatbelt 25 is detected by the seatbelt detection device 26*a*, the second alarm preferentially over the first alarm through the notification device 24.

According to the present invention configured as described above, when a moving object is detected and non-wearing of the seatbelt 25 is detected, the second alarm (alarm for the notification of non-wearing of the seatbelt 25) is outputted preferentially over the first alarm (alarm for the notification of detection of a moving object) through the notification device 24. Consequently, when a work is performed, for example, in such a situation in which a moving object such as another worker is present around the hydraulic excavator as a situation in which the hydraulic excavator is to be mounted on a trailer or the hydraulic excavator is to be parked at a narrow parking place, the operator can recognize with certainty the alarm for the notification of non-wearing of the seatbelt 25. Therefore, it is possible to prevent the operator from continuing the work while the operator remains without wearing the seatbelt 25.

Further, in the present embodiment, while the second alarm is being outputted through the notification device 24, the controller 60 does not output the first alarm through the notification device 24. Consequently, while the seatbelt 25 remains without being worn, the alarm for the notification of presence of a moving object (first alarm) is not outputted, and only the alarm for the notification of non-wearing of the seatbelt 25 (second alarm) is outputted. Therefore, the operator can surely recognize the alarm for the notification of non-wearing of the seatbelt 25.

It is to be noted that, although, in the present embodiment, the alarm for the notification of presence of a moving object (first alarm) is not outputted while the alarm for the notification of non-wearing of the seatbelt 25 (second alarm) continues to be outputted, the method of prioritizing the second alarm over the first alarm is not limited to this, and such an alternative method as to decrease the sound volume of the first alarm while the second alarm is outputted may be adopted.

Second Embodiment

A hydraulic excavator 100 according to a second embodiment of the present invention is described focusing on differences from the first embodiment.

FIG. 7 is a view depicting a configuration of an alarm system according to the present embodiment.

Referring to FIG. 7, the difference from the first embodiment (depicted in FIG. 3) is that the alarm system includes, in place of the single buzzer 24, a seatbelt buzzer 27 for the notification of non-wearing of the seatbelt 25 and a moving object detection buzzer 28 for the notification of detection of a moving object.

The buzzer outputting section 63 in the present embodiment outputs a seatbelt alarm through the seatbelt buzzer 27 at step S302 depicted in FIG. 6 and outputs a moving object detection alarm through the moving object detection buzzer 28 at step S304.

In the present embodiment, the alarm system includes the first notification device 28 and the second notification device 27 provided independently of the first notification device 28, and the controller 60 outputs a first alarm through the first notification device 28 and outputs a second alarm through the second notification device 27.

Also the hydraulic excavator 100 according to the present embodiment configured as described above can achieve advantages similar to those by the first embodiment.

Further, since the seatbelt buzzer 27 for the notification of non-wearing of the seatbelt 25 and the moving object detection buzzer 28 for the notification of detection of a moving object are provided independently of each other, the kinds (tone, volume, and pattern) of the first alarm for the notification of detection of a moving object and the second alarm for the notification of non-wearing of the seatbelt 25 can be changed flexibly. Therefore, it is possible to improve the distinguishability of the alarms.

While the embodiments of the present invention have been described in detail, the present invention is not limited to the embodiments described above and includes various modifications. For example, although, in the embodiments described above, the notification device is configured from a buzzer, this is not restrictive in the present invention and may be configured from a monitor, a lamp, or the like. Moreover, the embodiments described above are described in detail in order to describe the present invention in a manner easy to understand and are not necessarily restricted to those that include all of the components described hereinabove. Further, it is also possible to add part of components of another embodiment to components of a certain embodiment, and also it is possible to eliminate part of components of a certain embodiment or replace part of components of a certain embodiment with part of another embodiment.

DESCRIPTION OF REFERENCE CHARACTERS

1: Lower track structure
1a, 1b: Track hydraulic motor
1c, 1d: Crawler frame
1e, 1f: Crawler
2: Upper swing structure
2a: Swing frame
3: Front work implement
3a: Boom
3b: Arm
3c: Bucket
3d: Boom cylinder
3e: Arm cylinder
3f: Bucket cylinder
4: Operation room
14 to 16: Camera
17: Operator's seat
18, 19: Operation lever
20, 21: Travel lever
20a, 21a: Travel pedal
22: Gate lock lever
22a: Gate lock switch
23: Monitor
24: Buzzer (notification device)
25: Seatbelt
26: Buckle
26a: Seatbelt switch (seatbelt detection device)
27: Seatbelt buzzer (second notification device)
28: Moving object detection buzzer (first notification device)
60: Controller
61: Seatbelt wearing decision section
62: Moving object decision section
63: Buzzer outputting section
100: Hydraulic excavator
200: Alarm system

The invention claimed is:

1. A hydraulic excavator comprising:
a lower track structure;
an upper swing structure provided above the lower track structure;
an operation room provided in front of the upper swing structure;
a camera that monitors surroundings of the upper swing structure;
a notification device provided in the operation room;
a controller that detects presence/absence of a moving object from an image of the camera and outputs, in a case where the moving object is detected, an alarm through the notification device;
a seatbelt provided in the operation room; and
a seatbelt detection device configured to detect whether or not the seatbelt is worn, wherein
the controller is configured to
output, in a case where the moving object is detected and wearing of the seatbelt is detected by the seatbelt detection device, a first alarm through the notification device,
output, in a case where the moving object is not detected and non-wearing of the seatbelt is detected by the seatbelt detection device, a second alarm through the notification device, and
output, in a case where the moving object is detected and non-wearing of the seatbelt is detected by the seatbelt detection device, the second alarm preferentially over the first alarm through the notification device.

2. The hydraulic excavator according to claim 1, wherein the notification device includes a first notification device and a second notification device that is provided independently of the first notification device, and
the controller is configured to
output the first alarm through the first notification device, and
output the second alarm through the second notification device.

3. The hydraulic excavator according to claim 1, wherein, the controller is configured not to output the first alarm through the notification device while outputting the second alarm through the notification device.

* * * * *